United States Patent [19]
Furusho et al.

[11] 3,835,725
[45] Sept. 17, 1974

[54] STEERING ASSEMBLY OF A MOTOR VEHICLE

[75] Inventors: Hirosuke Furusho, Hyogo; Shigetaka Fukui, Osaka, both of Japan

[73] Assignee: Daihatsu Kogyo Kabushiki Kaisha, Osaka, Japan

[22] Filed: Apr. 4, 1973

[21] Appl. No.: 347,627

[30] Foreign Application Priority Data
Apr. 11, 1972   Japan.................................. 47-36200

[52] U.S. Cl..................................... 74/492, 70/252
[51] Int. Cl............................................. B62d 1/18
[58] Field of Search ............ 74/492, 493; 280/87 A; 70/252

[56] References Cited
UNITED STATES PATENTS
| | | | |
|---|---|---|---|
| 3,262,332 | 7/1966 | Wight | 74/493 |
| 3,461,740 | 8/1969 | Tajima et al. | 74/492 |
| 3,504,567 | 4/1970 | Ohashi et al. | 74/492 |
| 3,545,300 | 12/1970 | Furusho | 74/492 |

FOREIGN PATENTS OR APPLICATIONS
| | | | |
|---|---|---|---|
| 1,166,750 | 10/1969 | Great Britain | 74/492 |

*Primary Examiner*—Samuel Scott
*Assistant Examiner*—F. D. Shoemaker
*Attorney, Agent, or Firm*—Pierce, Scheffler & Parker

[57] ABSTRACT

A sleeve is fixed to an upper shaft portion of a steering shaft consisting of upper and lower shaft portions, and this sleeve is used for two purposes, that is to say, for receiving a key operated member of a handle lock device on a supporting member fixed to the body of the motor vehicle, and for supporting an upper end of a collapsible energy absorbing member which is supported at its lower end by the lower shaft portion of the steering shaft.

1 Claim, 5 Drawing Figures

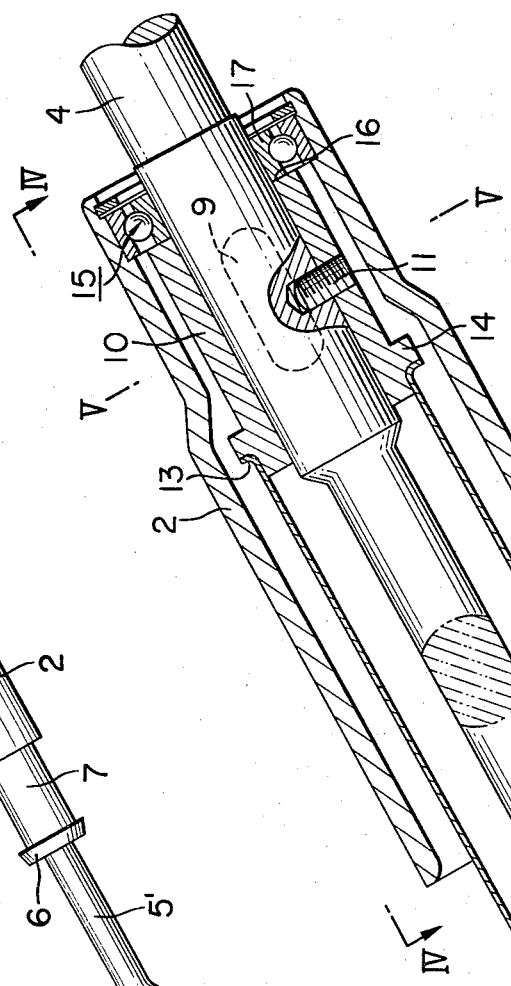
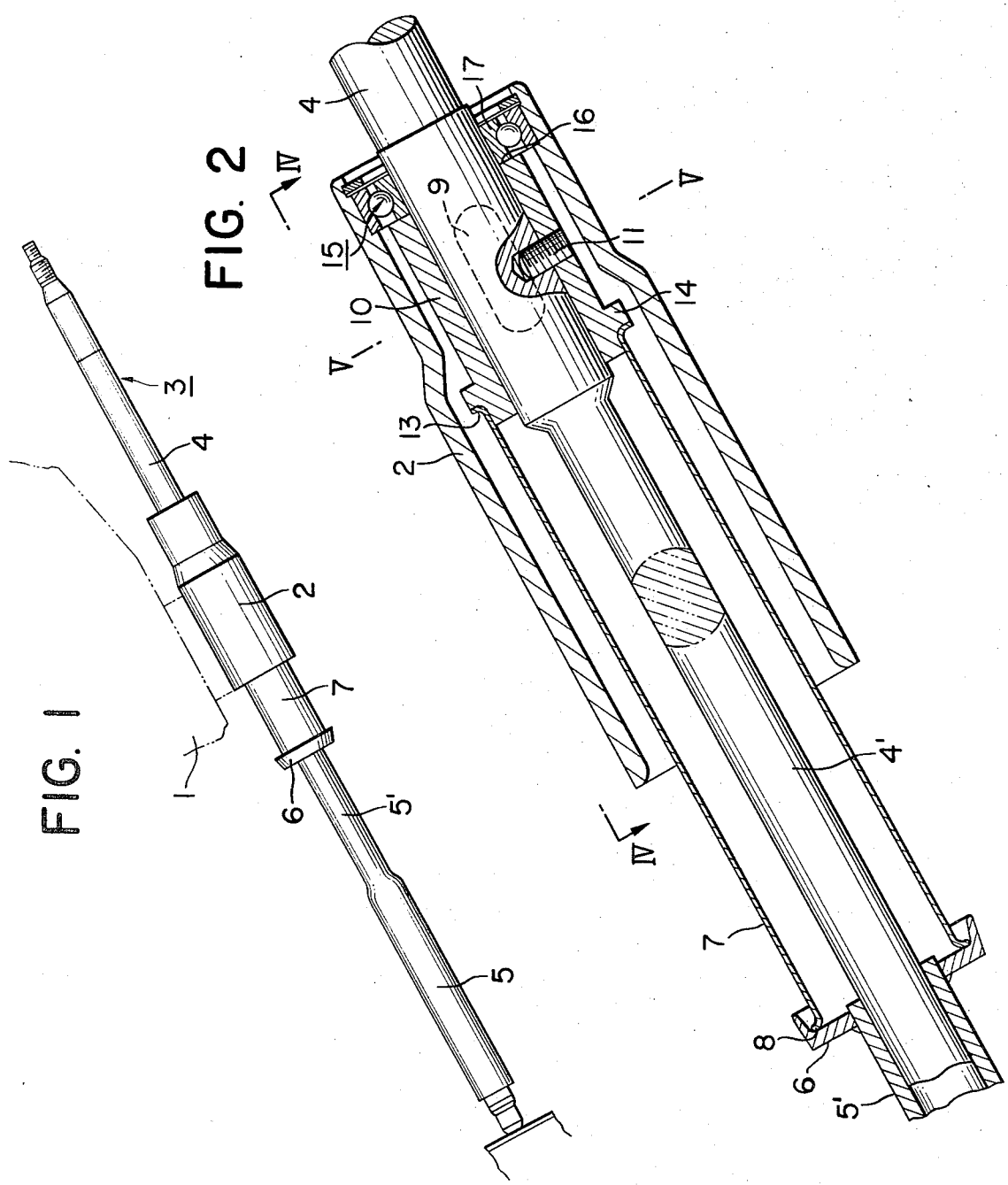

STEERING ASSEMBLY OF A MOTOR VEHICLE

This invention relates to a steering shaft assembly of a motor vehicle.

Heretofore, a steering lock device such as disclosed in British Pat. No. 1,081,367 and a collapsible energy absorbing member such as shown in U.S. Pat. No. 3,545,300 are provided for a steering assembly of a motor vehicle as independent means.

The object of the present invention is to provide a steering assembly which is simplified in its construction concerning the provision of the above two means.

The construction of the steering assembly according to the present invention is exemplified in the drawings, in which:

FIG. 1 is an elevational view showing the steering assembly according to the present invention;

FIG. 2 and FIG. 3 are enlarged longitudinal section views showing the internal construction of the above steering assembly;

In FIG. 1, a portion of body of a motor vehicle is designated by numeral 1. A supporting member 2 is fixed to the body 1. The supporting member 2 is shown in its longitudinal section in FIG. 2, and is shown in profile seen from IV — IV direction of FIG. 2 in FIG. 4.

Figure 3:
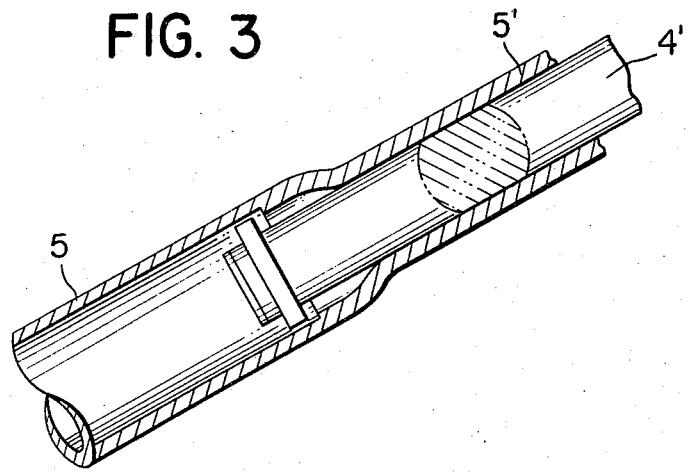

There is provided a steering shaft consisting of an upper shaft portion 4 and a lower shaft portion 5. The upper shaft portion 4 is solid and one end part 4' thereof engages with the hollow part 5' of the lower shaft portion 5 telescopically. To transmit the rotation of the upper shaft portion 4 to the lower shaft portion 5, engaging portions 4' and 5' of these shaft portions 4,5 are flattened at their sides so as to prevent relative rotation therebetween. (See FIG. 2 and FIG. 3).

The lower shaft portion 5 is provided with a seat 6 at its top end. As seen in FIG. 2, this seat 6 bears against one end 8 of a collapsible energy absorbing pipe 7.

Figure 4:
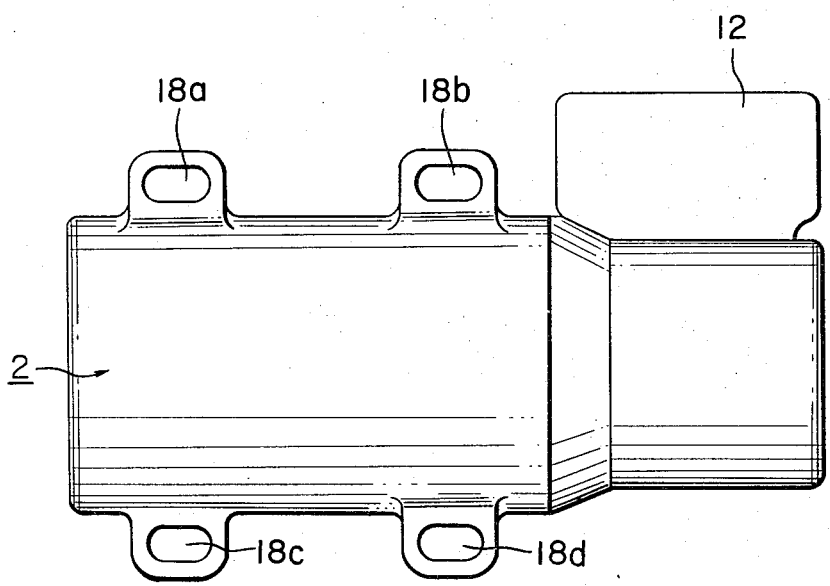
FIG. 4 is a view of a supporting member showing its profile in the direction of IV — IV in FIG. 2.
Figure 5:
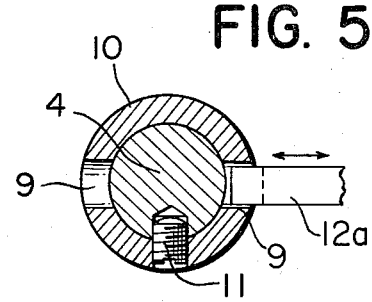
FIG. 5 is the cross-sectional view taken on the line V — V of FIG. 2.

Referring to FIG. 2, a sleeve 10 with a longitudinally elongated hole 9 is fixed to the upper shaft portion 4 by a screw 11 (See FIG. 5 also). The long hole 9 is one for receiving a key operated retaining member 12a of a handle lock device. The handle lock device is shown in FIG. 4 by a numeral 12. This device is attached to the supporting member 2 already mentioned and functions as illustrated in FIG. 5, when in the locked position, to engage member 12a with one of the two holes 9 and prevent any rotation of sleeve 10 and hence also steering shaft 4 to which it is secured by retaining screw 11.

The sleeve 10 is provided with a collar 14 which abuts against the top end of the collapsible energy absorbing pipe 7. The steering shaft is supported at its upper shaft portion 4 by a bearing of the rolling type such as a ball bearing 15 of which the outer race is fixed to the supporting member 2. The fit between the inner race 17 of the ball bearing 15 and the upper shaft portion of the steering shaft is a sliding one, but since the top end 16 of the sleeve 10 abuts against the inner race 17 of the ball bearing 15, the upper shaft portion 4 cannot move axially in an ordinary state.

The supporting member 2 is fastened to the body 1 by four bolts which pass through holes 18a – 18d shown in FIG. 4.

Upon an occurrence of a collision, the energy absorbing pipe 7 can be collapsed by downward and upward forces. The downward force is transmitted to the pipe 7 through the upper shaft portion 4, the fastening screw 11 and the sleeve 10. On the other hand, the upward force is transmitted to the pipe 7 through the lower shaft portion 5. The ball bearing 15 acts as a stopper for the upward force, but it does not act as a stopper for the downward force.

The feature of the above explained construction is in the provision of the sleeve 10 which is fixed to the upper shaft portion 4. This sleeve 10 is used for receiving a key operated retaining member of a handle locking device, on the one hand, and is used as a member for supporting the energy absorbing pipe 7 on the other hand, thus simplifying the construction of the steering assembly.

We claim:

1. A steering assembly of a motor vehicle comprising a steering shaft including an upper shaft portion and a lower shaft portion telescopically engaging with the upper shaft portion, a steering shaft supporting member fixed to the motor vehicle and provided with a handle lock device including a key-operated retaining member for locking the steering shaft against rotation, a bearing of the rolling type accommodated between the supporting member and the upper shaft portion, the outer race of the bearing being secured to the supporting member and the inner race of the bearing fitting slidably for the upper shaft portion, a sleeve fixed to the upper shaft portion and provided with a hole for receiving the key-operated retaining member of the handle lock device, and a longitudinally collapsible energy absorbing member surrounding the upper shaft portion and located between the sleeve and the lower shaft portion, one end of said collapsible energy absorbing member being engaged with the sleeve and the opposite end thereof being engaged with the lower shaft portion.

* * * * *